W. H. NOELTING.
CASTER.
APPLICATION FILED FEB. 14, 1920.
1,346,240.
Patented July 13, 1920.
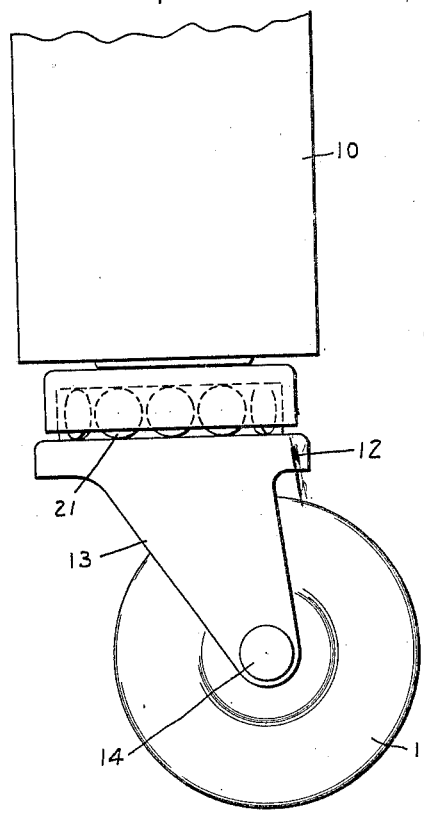
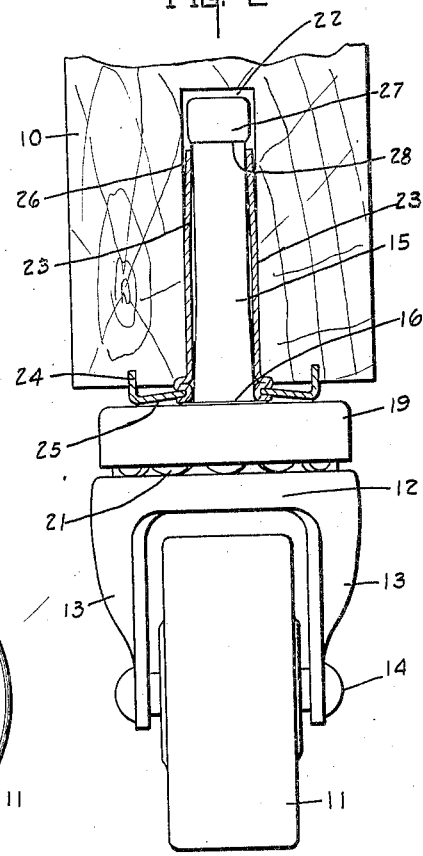
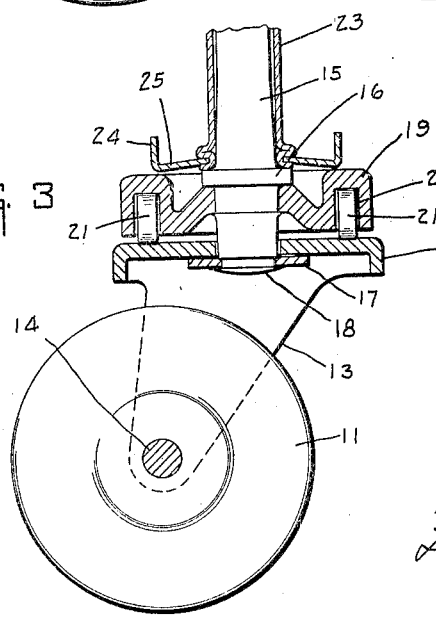
INVENTOR.
WILLIAM H. NOELTING
BY
Lockwood Lockwood
ATTORNEYS.

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

CASTER.

1,346,240.   Specification of Letters Patent.   Patented July 13, 1920.

Application filed February 14, 1920. Serial No. 358,698.

*To all whom it may concern:*

Be it known that I, WILLIAM H. NOELTING, a citizen of the United States, and a resident of Evansville, county of Vanderburg, and State of Indiana, have invented a certain new and useful Caster; and I do hereby declare that the following is a full, clear, and exact description thereof, reference being had to the accompanying drawings, in which like numerals refer to like parts.

The chief object of this invention is to provide a strong improved roller bearing caster producing great ease of turning, wherein the roller race is so designed that the same will not collect dust or dirt, wherein further provision is made for the caster to rotate in the socket, should for any reason the rollers jam or break, and wherein several of the parts are in spaced relation with each other to secure frictionless operation.

The full nature of the invention will be understood from the accompanying drawings and the following description and claim.

In the drawings, which are made a part of this application, Figure 1 is a side elevation showing the improved caster applied to a furniture leg. Fig. 2 is an end view of the same, parts being shown in section to show the socket and stem arrangement. Fig. 3 is a side view showing in section the rollers, race and stem.

In the drawings there is shown a leg 10 in which the caster is mounted. The caster comprises the usual roller 11, a roller support having a yoke or horn portion 12 with depending ears 13 supporting a rivet 14 at the ends thereof. The rivet 14 rotatably supports the caster roller 11 in the usual manner. The yoke portion 12 is herein shown flat and circular, and the upper face thereof provides a runway for the roller bearing. Extending upwardly and centrally from the circular yoke is a caster stem 15, the same having an annular shoulder 16 suitably spaced from the yoke upon which the roller bearing is mounted. The stem 15 is rotatably and suitably secured in the yoke portion by a washer 17, the end of the stem being upset, riveted, or punched, as shown at 18, to overlie the washer and hold the same.

A suitable roller race 19 is herein shown secured upon the stem 15 adjacent the yoke 12 and in spaced relation therewith. The race 19 has a circular channel 20 with a depending flange or apron concentric with the stem and in spaced relation with the yoke portion 12. In the channel 20 is loosely mounted a plurality of disks or rollers 21, the same bearing upon the upper portion of the channel 20 and upon the yoke. Any upward movement of the race 19 upon the stem 15 is prevented by the shoulder 16. With this construction and the addition of the apron, dirt or other impedimentia cannot collect in the channel 20 and interfere with the movement of the rollers 21 or increase the friction incident to the operation thereof.

If for any reason the rollers should jam and tend to prevent the yoke and roller from rotating when necessary, provision is made whereby the stem, yoke and roller will rotate as a unit in the socket, the same being seated in the socket recess 22 formed in the furniture leg 10. The improved socket comprises a tubular portion 23 provided at its outer end with anchoring teeth 24 for suitably securing the socket irremovably in the leg 10. Herein the anchoring teeth are so formed that they also provide a bearing ring or plate portion 25 upon which the race 19 bears when the stem turns in the socket 22.

To yieldingly retain the stem 15 within the socket, yet allow the same to be removed therefrom whenever desired, and also allow the same to rotate therein when necessary, the tubular socket 23 is herein provided with inwardly extending slit portions 26, the same acting as spring clips. The stem 15 is herein shown provided at its outer end with a head portion 27, the same being formed by tapering the stem as shown so that a shoulder 28 is formed against which the spring clips 26 engage to yieldingly hold the caster in the recess 22, so that the caster will not drop out of said socket when the leg is removed from the floor. This construction of the caster provides that should the rollers bind, the caster still is capable of revolving with respect to the leg, since the stem 15 is rotatably mounted in the socket 23, as shown.

From the foregoing it will be understood that the improved roller bearing caster is of few parts, strongly and economically constructed, and provides greater ease of turning than the ordinary roller bearing casters. In this caster the stem will always revolve, the same being accomplished by the stationary socket, revolving stem and the improved roller bearing.

The invention claimed is:

A caster including in combination a caster roller, a roller support rotatably mounting said roller and having a yoke portion, a stem rotatably mounted upon said yoke portion, a race including a roller channel secured to said stem in spaced relation with said yoke portion, rollers in said race rollable upon said yoke portion and the bed of said channel, and an apron adjacent and in spaced relation with said yoke portion and said channel to protect said rollers and insure frictionless operation.

In witness whereof I have hereunto affixed my signature.

WILLIAM H. NOELTING.